US011756308B2

(12) United States Patent
Balazs

(10) Patent No.: US 11,756,308 B2
(45) Date of Patent: Sep. 12, 2023

(54) NEURAL NETWORK DEVICE AND METHOD USING A NEURAL NETWORK FOR SENSOR FUSION

(71) Applicant: Infineon Technologies AG, Neubiberg (DE)

(72) Inventor: Gabor Balazs, Munich (DE)

(73) Assignee: Infineon Technologies AG, Neubiberg (DE)

( * ) Notice: Subject to any disclaimer, the term of this patent is extended or adjusted under 35 U.S.C. 154(b) by 460 days.

(21) Appl. No.: 16/884,597

(22) Filed: May 27, 2020

(65) Prior Publication Data
US 2020/0377108 A1    Dec. 3, 2020

(30) Foreign Application Priority Data
May 31, 2019 (EP) .................................... 19177666

(51) Int. Cl.
G06V 20/58       (2022.01)
B60W 50/00       (2006.01)
G06N 3/088       (2023.01)
G06F 18/25       (2023.01)
G06N 3/045       (2023.01)
G06N 3/047       (2023.01)
G06V 10/80       (2022.01)
G06V 10/82       (2022.01)

(52) U.S. Cl.
CPC ......... *G06V 20/58* (2022.01); *B60W 50/0097* (2013.01); *G06F 18/25* (2023.01); *G06N 3/045* (2023.01); *G06N 3/047* (2023.01); *G06N 3/088* (2013.01); *G06V 10/803* (2022.01); *G06V 10/82* (2022.01); *B60W 2420/42* (2013.01); *B60W 2420/52* (2013.01); *B60W 2540/041* (2020.02)

(58) Field of Classification Search
CPC ................................................ B60W 50/0097
See application file for complete search history.

(56) References Cited

U.S. PATENT DOCUMENTS

2017/0100661 A1*  4/2017  Slav .................... A63F 13/213
2019/0235515 A1*  8/2019  Shirvani ................ G06N 20/00
2019/0236955 A1*  8/2019  Hu ....................... G05D 1/0212
(Continued)

FOREIGN PATENT DOCUMENTS

CN         101413806 A  *  4/2009
WO    WO-2020053611 A1  *  3/2020   ........... G06K 9/0063

OTHER PUBLICATIONS

Fazekas, Zoltan et al., "ANN-based Classification of Urban Road Environments from Traffic Sign and Crossroad Data", Acta Polytechnica Hungarica, vol. 15, No. 8, Aug. 4, 2018, 18 pages.
(Continued)

*Primary Examiner* — Shelley Chen
(74) *Attorney, Agent, or Firm* — Slater Matsil, LLP

(57) ABSTRACT

In accordance with an embodiment, a neural network is configured to: process a first grid representing at least a first portion of a field of view of a first sensor; process a second grid representing at least a second portion of a field of view of a second sensor; and fuse the processed first grid with the processed second grid into a fused grid, where the fused grid includes information about the occupancy of the first portion of the field of view of the first sensor and the occupancy of the second portion of the field of view of the second sensor.

20 Claims, 12 Drawing Sheets

(56) References Cited

U.S. PATENT DOCUMENTS

| | | | |
|---|---|---|---|
| 2020/0310753 A1* | 10/2020 | Radu | G06F 7/32 |
| 2020/0377108 A1* | 12/2020 | Balazs | G06F 18/251 |
| 2020/0380270 A1* | 12/2020 | Cox | G01C 21/3819 |
| 2021/0334556 A1* | 10/2021 | Vignard | G06T 7/174 |
| 2022/0129726 A1* | 4/2022 | Marina | G01S 13/931 |

OTHER PUBLICATIONS

John, V., et al., "Sensor Fusion of Intensity and Depth Cues using the ChiNet for Semantic Segmentation of Road Scenes", IEEE Intelligent Vehicles Symposium (IV), China, Jun. 26-30, 2018, 6 pages.

* cited by examiner

NEURAL NETWORK DEVICE AND METHOD USING A NEURAL NETWORK FOR SENSOR FUSION

This application claims the benefit of European Patent Application No. 19177666, filed on May 31, 2019, which application is hereby incorporated herein by reference in its entirety.

TECHNICAL FIELD

Various embodiments generally relate to a neural network device and a method.

BACKGROUND

Various systems, such as advanced driver assistance systems (ADAS), may include a variety of sensors of different sensor type. Each sensor type may have advantages and shortcomings. In order to overcome the shortcomings of each sensor type the data provided by the respective sensors of different sensor type may be combined, e.g. fused.

An ADAS may include sensors of different types for environment perception, such as LIDAR (light detection and ranging) sensors, radar sensors, monocular camera sensors, and stereo camera sensors. Cost efficient sensors like radar sensors and camera sensors usually provide sparse environmental information, and therefore environmental information should be gathered over time in order to obtain a meaningful environmental model. For a free space estimation dense environmental information are necessary, however, sensors providing dense environmental information, such as LIDAR sensors, which have a high cost and are thus not suitable for mass market. It is to be noted that some cameras may be configured to provide images. In case so called smart sensors are used, usually there are no raw images, since smart sensors are processing the detected data within the sensor itself.

In various embodiments a neural network device and a method using a neural network for sensor fusion are provided, which are capable of generating dense environmental information out of sparse input sensor data.

SUMMARY

According to an embodiment, a neural network device includes a neural network. The neural network is configured to process a first grid including a plurality of grid cells. The first grid represents at least a first portion of a field of view of a first sensor. At least one grid cell has information about an occupancy of the first portion of the field of view assigned to the at least one grid cell, the information being based on data provided by the first sensor. The neural network is further configured to process a second grid including a plurality of grid cells. The second grid represents at least a second portion of a field of view of a second sensor. At least one grid cell has information about an occupancy of the second portion of the field of view assigned to the at least one grid cell, the information being based on data provided by the second sensor. The neural network is further configured to fuse the processed first grid with the processed second grid into a fused grid. The fused grid includes information about the occupancy of the first portion of the field of view of the first sensor and the occupancy of the second portion of the field of view of the second sensor.

A system may include the neural network device. The first sensor is configured to provide data for the information of the first grid and the second sensor is configured to provide data for the information of the second grid.

A vehicle may include a driver assistance system. The driver assistance system includes the above system.

According to an embodiment, a method includes a neural network processing a first grid including a plurality of grid cells. The first grid represents at least a first portion of a field of view of a first sensor. At least one grid cell has information about an occupancy of the first portion of the field of view assigned to the at least one grid cell, the information being based on data provided by the first sensor. The neural network is further processing a second grid including a plurality of grid cells. The second grid represents at least a second portion of a field of view of a second sensor. At least one grid cell has information about an occupancy of the second portion of the field of view assigned to the at least one grid cell, the information being based on data provided by the second sensor. The neural network is further fusing the processed first grid with the processed second grid into a fused grid. The fused grid includes information about the occupancy of the first portion of the field of view of the first sensor and the occupancy of the second portion of the field of view of the second sensor.

According to an embodiment, a method of training a neural network includes: receiving first information about an occupancy of a first field of view from a first sensor, providing the first information to a first grid including a plurality of grid cells, receiving second information about an occupancy of a second field of view from a second sensor, providing the second information to a second grid including a plurality of grid cells, receiving ground truth data, fusing the first grid and the second grid into a fused grid, and training the neural network by comparing the ground truth data with a network output provided by the fused grid.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION OF ILLUSTRATIVE EMBODIMENTS

Figure 1A:
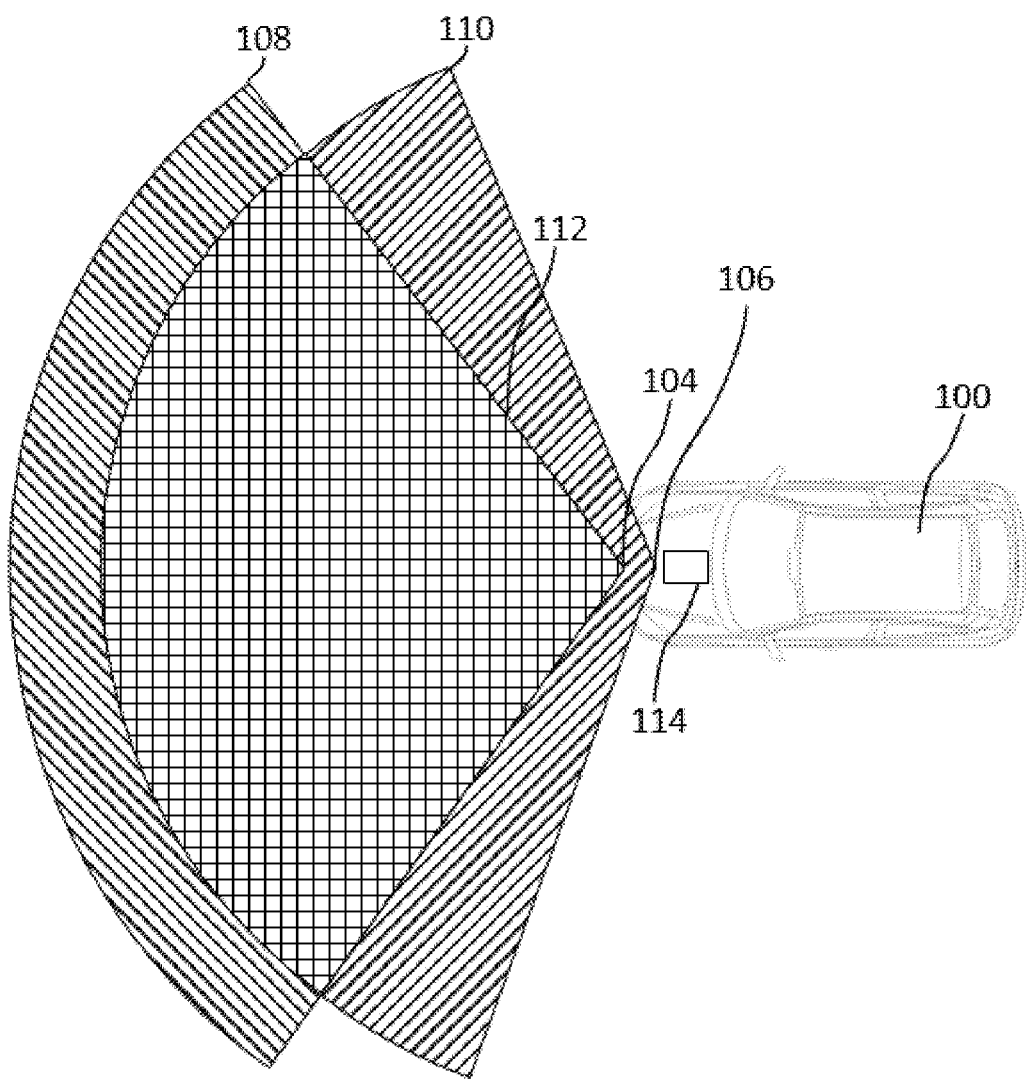
FIG. 1A shows a vehicle including an environment perception system according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments. Various embodiments are described in connection with methods and various embodiments are described in connection with devices. However, it may be understood that embodiments described in connection with methods may similarly apply to the devices, and vice versa.

In an embodiment, a "circuit" may be understood as any kind of a logic implementing entity, which may be hardware, software, firmware, or any combination thereof. Thus, in an embodiment, a "circuit" may be a hard-wired logic circuit or a programmable logic circuit such as a programmable processor, e.g. a microprocessor (e.g., a Complex Instruction Set Computer (CISC) processor or a Reduced Instruction Set Computer (RISC) processor). A "circuit" may also be software being implemented or executed by a processor, e.g. any kind of computer program, e.g. a computer program using a virtual machine code such as e.g. Java. Any other kind of implementation of the respective functions which will be described in more detail below may also be understood as a "circuit" in accordance with an alternative embodiment.

Various embodiments relate to a neural network device and a method using a neural network for sensor fusion, wherein at least two grids, which are provided by at least two sensors and which include feature-level data, are fused to a fused grid. The fusion of feature-level data has the effect that the fused grid includes sensor-specific information. An unsupervised training of the neural network using a dense grid provided by another sensor has the further effect that the trained neural network is capable of generating dense environmental information out of sparse input sensor data.

Thus, a neural network device and a method using a neural network for sensor fusion may be capable of generating a dense environmental model out of sparse input sensor data.

It is another aspect to provide a neural network device and a method using a neural network for sensor fusion, which are capable of classifying a large unobserved regions, in other words, which are capable of classifying large regions without explicit measurements.

It is another aspect to provide a neural network device and a method using a neural network for sensor fusion, which are capable of providing a dense environmental model within one measurement cycle.

It is another aspect to provide a neural network device and a method using a neural network for sensor fusion, which does not require gathering information over time.

FIG. 1A shows a vehicle 100 including an environment perception system according to various embodiments. The vehicle 100 may be for example a combustion engine vehicle, an electric vehicle, a hybrid vehicle, a hybrid electric vehicle or a combination thereof. Furthermore, the vehicle may be a car, a truck, a ship, a drone, an aircraft, and the like. The vehicle 100 may include a first sensor 104. The first sensor 104 may include at least one of a first camera sensor or a first radar sensor. The first sensor 104 may have a first field of view 108. The vehicle 100 may further include a second sensor 106. The second sensor may include at least one of a second camera sensor or a second radar sensor. The second sensor 106 may have a second field of view no. According to an embodiment the first field of view 108 and the second field of view no may at least partially overlap forming a shared field of view 112. In various embodiments, the first field of view 108 and the second field of view no do not overlap and thus do not form a shared field of view 112. The vehicle 100 may further include additional sensors (in general an arbitrary number of sensors), wherein each sensor of the plurality of sensors may have a field of view. The plurality of sensors may include various sensors of the same type and/or various sensors of different type. The various sensors of the plurality of sensors may differ for example in the sensor type, in the detection principle, and/or in the detection specification (e.g., the sensors may detect different colors, e.g. a sensor may be specified to detect light of an indicator, e.g. a sensor may be specified to detect a backlight). The vehicle 100 may further include a processing circuit 114. The processing circuit 114 may be configured to process the data provided by the plurality of sensors.

Figure 1B:
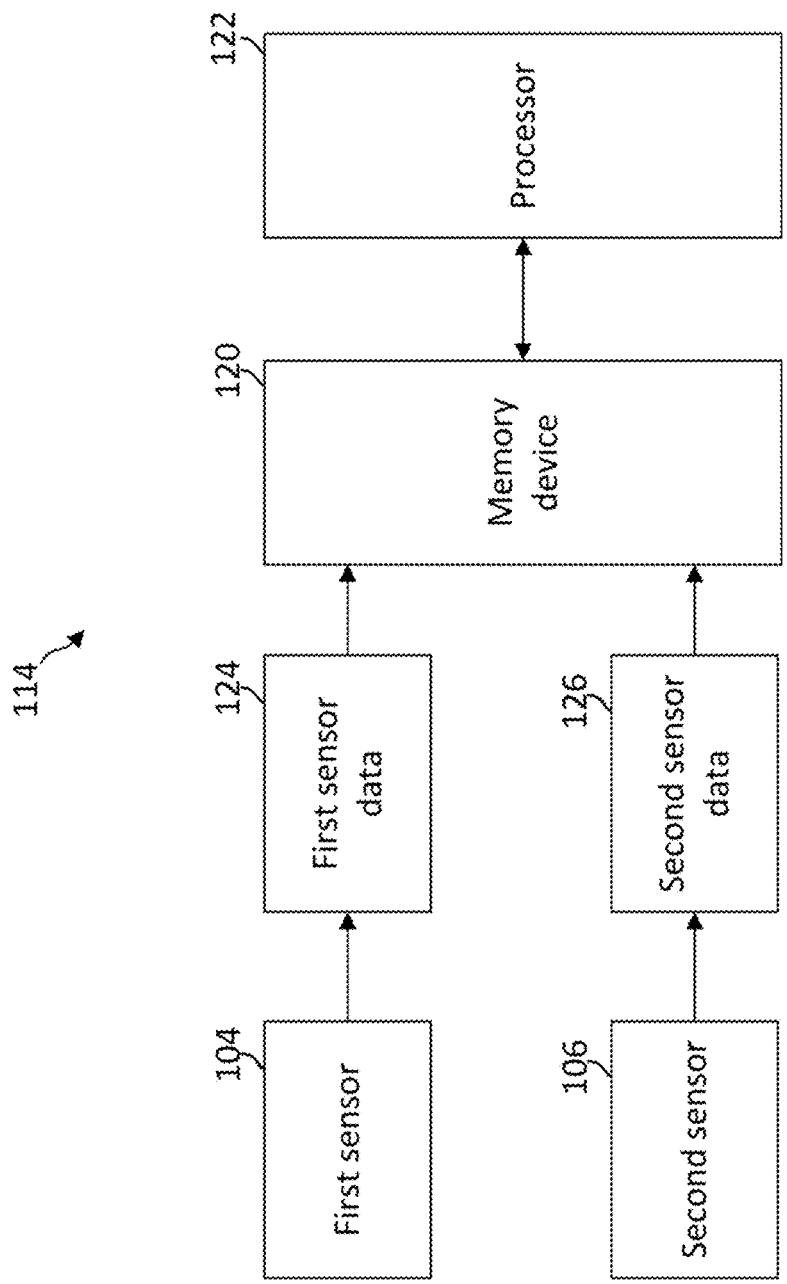
FIG. 1B shows a processing circuit including a neural network according to various embodiments.

FIG. 1B shows a processing circuit 114 including a neural network according to various embodiments. The processing circuit 114 may be configured to process the first sensor data 124 provided by the first sensor 104 and the second sensor data 126 provided by the second sensor 106. The first sensor 104 and/or the second sensor 106 may be smart sensors. The first sensor 104 and/or the second sensor 106 may be configured to provide digital sensor data. The first sensor 104 and/or the second sensor 106 may be configured to provide pre-processed sensor data. The pre-processed sensor data may include feature-level sensor data. The pre-processed sensor data may include target lists in case of radar sensors and object lists on case of camera sensors. In various embodiments, the first sensor 104 and/or the second sensor 106 may be configured to provide analog sensor data and the processing circuit 114 may include an analog-digital converter to convert the analog sensor data into digitized sensor data. In various embodiments, the first sensor 104 and/or the second sensor 106 may be configured to provide raw sensor data and the processing circuit 114 may be configured to pre-process the raw sensor data. The processing circuit 114 may include a memory device 120. The memory device 120 may include a memory which is for example used in the processing carried out by a processor. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory). The memory device 120 may be configured to store the first data 124 and/or the second data 126. The processing circuit 114 may further include at least one processor 122. The at least one processor 122 may be any kind of circuit, i.e. any kind of logic implementing entity, as described above. In various embodiments, the at least one processor 122 may be configured to process the data provided by the plurality of sensors.

Figure 1C:
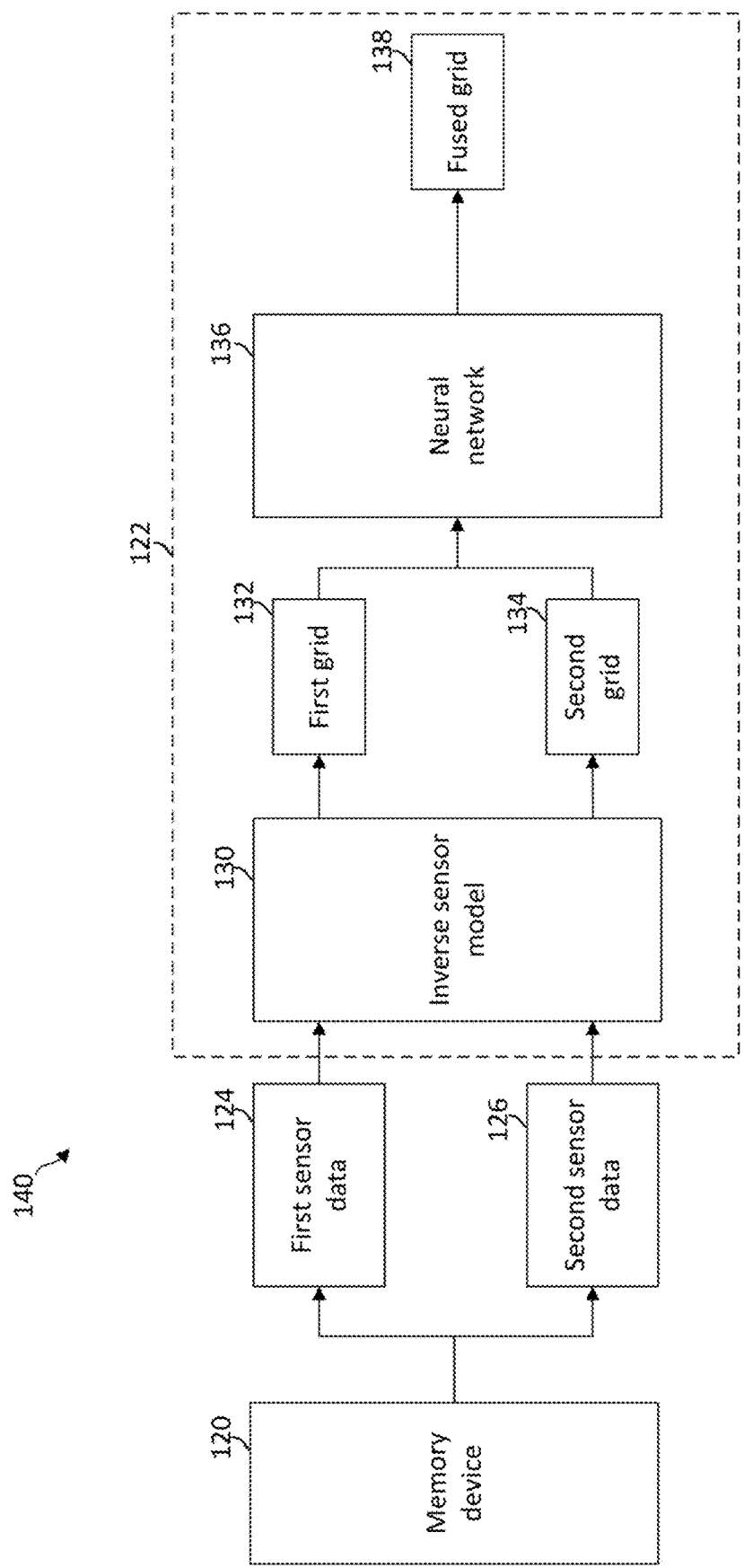
FIG. 1C shows a processing system including a neural network according to various embodiments.

FIG. 1C shows a processing system 140 according to various embodiments. The processing system 140 may include the memory device 120. The memory device 120 may be configured to store the sensor data provided by the plurality of sensors. The memory device 120 may be configured to store the first sensor data 124 provided by the first sensor 104. The memory device 120 may be further configured to store the second sensor data 126 provided by the second sensor 106. The processing system 140 may further include the processor 122. The processor 122 may be configured to receive the sensor data stored in the memory 120 and may be configured to process the sensor data.

The processor 122 may implement an inverse sensor model (ISM) 130. The ISM 130 may include a plurality of ISM. The ISM 130 may be specified for each sensor of the plurality of sensors. In other words, each ISM of a plurality of ISM may be assigned to a sensor of the plurality of sensors. The ISM 130 may be obtained for each sensor of the plurality of sensors using a neural network (e.g., a convolutional neural network, an auto-encoder neural network, or a combination of both). Each ISM of the plurality of ISM may be configured to generate an occupancy grid (e.g., from the input data 124 and 126).

The ISM 130 may be configured to process pre-processed first sensor data 124 and/or pre-processed second sensor data 126. The pre-processed first sensor data 124 may be provided by the first sensor 104. The pre-processed second sensor data 126 may be provided by the second sensor 106. A first ISM may be applied to the first sensor data 124. The first ISM may be configured to provide information about the occupancy of a first portion of a first field of view 108 of the first sensor 104. A second ISM may be applied to the second sensor data 126. The second ISM may be configured to provide information about the occupancy of a second portion of a second field of view no of the second sensor 106. Applying the first ISM may provide a first grid 132. The first grid 132 may include a plurality of grid cells. The first grid 132 may represent at least a first portion of the first field of view 108 of the first sensor 104. At least one grid cell of the plurality of grid cells of the first grid may have information about an occupancy of the first portion of the first field of view 108 assigned to the at least one grid cell. The information may be based on data provided by the first sensor 104. Applying the second ISM may provide a second grid 134. The second grid 134 may include a plurality of grid cells. The second grid 134 may represent at least a second portion of the second field of view no of the second sensor 106. At least one grid cell of the plurality of grid cells of the second grid 134 may have information about an occupancy of the second portion of the second field of view no assigned to the at least one grid cell. The information may be based on data provided by the second sensor 106. The structure of the first grid 132 may be similar to the structure of the second grid 134. The grid cells of the first grid 132 may have the same size and/or shape. The grid cells of the second grid 134 may have the same size and/or shape. The first grid 132 may be a first occupancy grid. The second grid 134 may be a second occupancy grid.

The processor 122 may implement at least a portion of a neural network 136. The neural network 136 may be configured to process the first grid 132 provided by the first ISM and the second grid 134 provided by the second ISM to a fused grid 138. The neural network 136 may be configured to determine a free space within the fused grid 138 based on the fused grid 138 and/or based on the first grid 132 and the second grid 134. The fused grid 138 may include information about the occupancy of the first portion of the first field of view 108 of the first sensor 104 and the occupancy of the second portion of the second field of view 110 of the second sensor 106. The first portion of the first field of view 108 and the second portion of the second field of view 110 may at least partially overlap. In various embodiments, the first portion of the first field of view 108 and the second portion of the second field of view 110 do not overlap. Various embodiments may provide a neural network device and a method using a neural network for sensor fusion and advanced free space estimation. In other words, various embodiments may provide a neural network device and a method using a neural network for sensor fusion with combined free space estimation.

The neural network 136 may be further configured to determine, for at least one grid cell of the fused grid 138, a probability of the occupancy of the first portion of the first field of view 108 of the first sensor 104 and the second portion of the second field of view 110 of the second sensor 106 assigned to the at least one grid cell of the fused grid 138.

The neural network 136 may be further configured to take into account the information about an occupancy of a portion of the field of view next to the first portion and/or next to the second portion when determining information about the occupancy assigned to a respective fused grid cell of the fused grid 138.

The processor 122 may be further configured to process the sensor data provided by additional sensors. The ISM 130 may be configured to process the sensor data provided by the plurality of sensors and may be configured to provide a plurality of grids, wherein each grid of the plurality of grids is assigned to a respective sensor of the plurality of sensors. The neural network 136 may be configured to process the plurality of grids provided by the ISM 130, in other words, generated by the inverse sensor models 130. The neural network 136 may be configured to process the plurality of grids to a fused grid 138. The fused grid 138 may include information about the occupancy of a portion of the field of view of each sensor of the plurality of sensors. The neural network 136 may be further configured to determine, for at least one grid cell of the fused grid 138, a probability of the occupancy of a portion of a field of view of each sensor of the plurality of sensors assigned to the at least one grid cell of the fused grid 138. The neural network 136 may be further configured to take into account the information about an occupancy of a portion of the field of view next to the portion of the field of view of each sensor of the plurality of sensors when determining information about the occupancy assigned to a respective fused grid cell of the fused grid 138.

The neural network 136 may be trained by comparing the fused grid 138 with ground truth data. The training may include updating the neural network 136 based on the comparison of the fused grid 138 with the ground truth data. The training of the neural network 136 may be an unsupervised training. The training will be described in more detail below.

Figure 2:
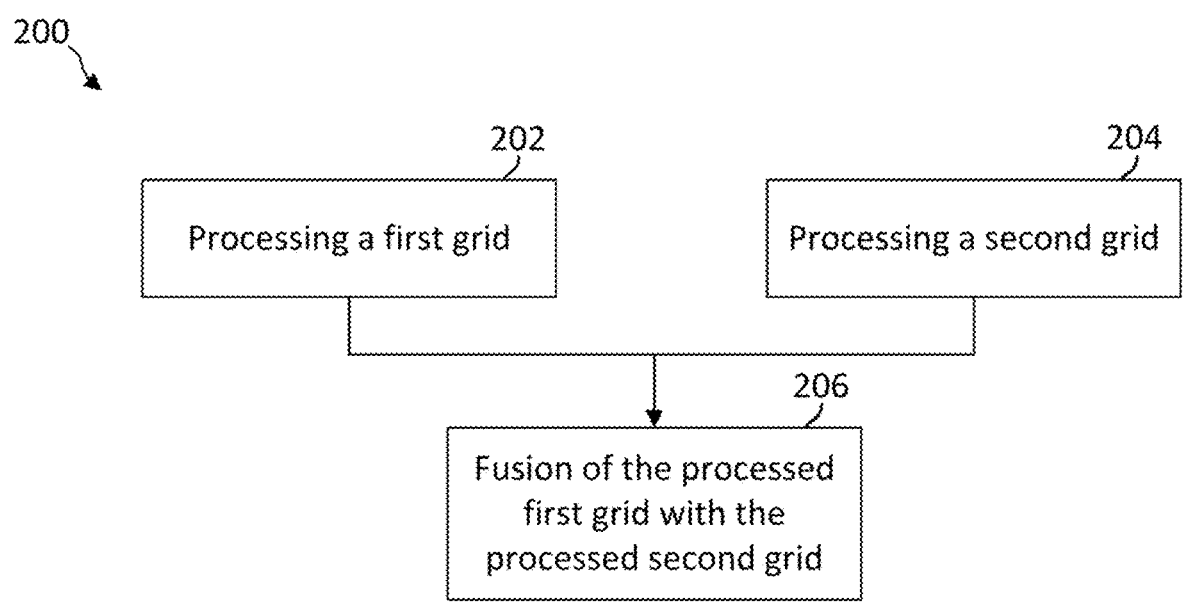
FIG. 2 shows a method using a neural network for sensor fusion according to various embodiments.

FIG. 2 shows a method 200 using a neural network according to various embodiments. The method 200 may be performed by a processor such as e.g., the processing circuit 114. The method 200 may use the neural network 136. The method 200 may include processing a first grid 132 in 202. The method 200 may further include processing a second grid 134 in 204. The method 200 may further include fusing the processed first grid 132 with the processed second grid 134 into a fused grid 138 in 206.

The method 200 may further include processing additional grids. The method 200 may further include fusing the processed plurality of grids into a fused grid 138.

Figure 3:
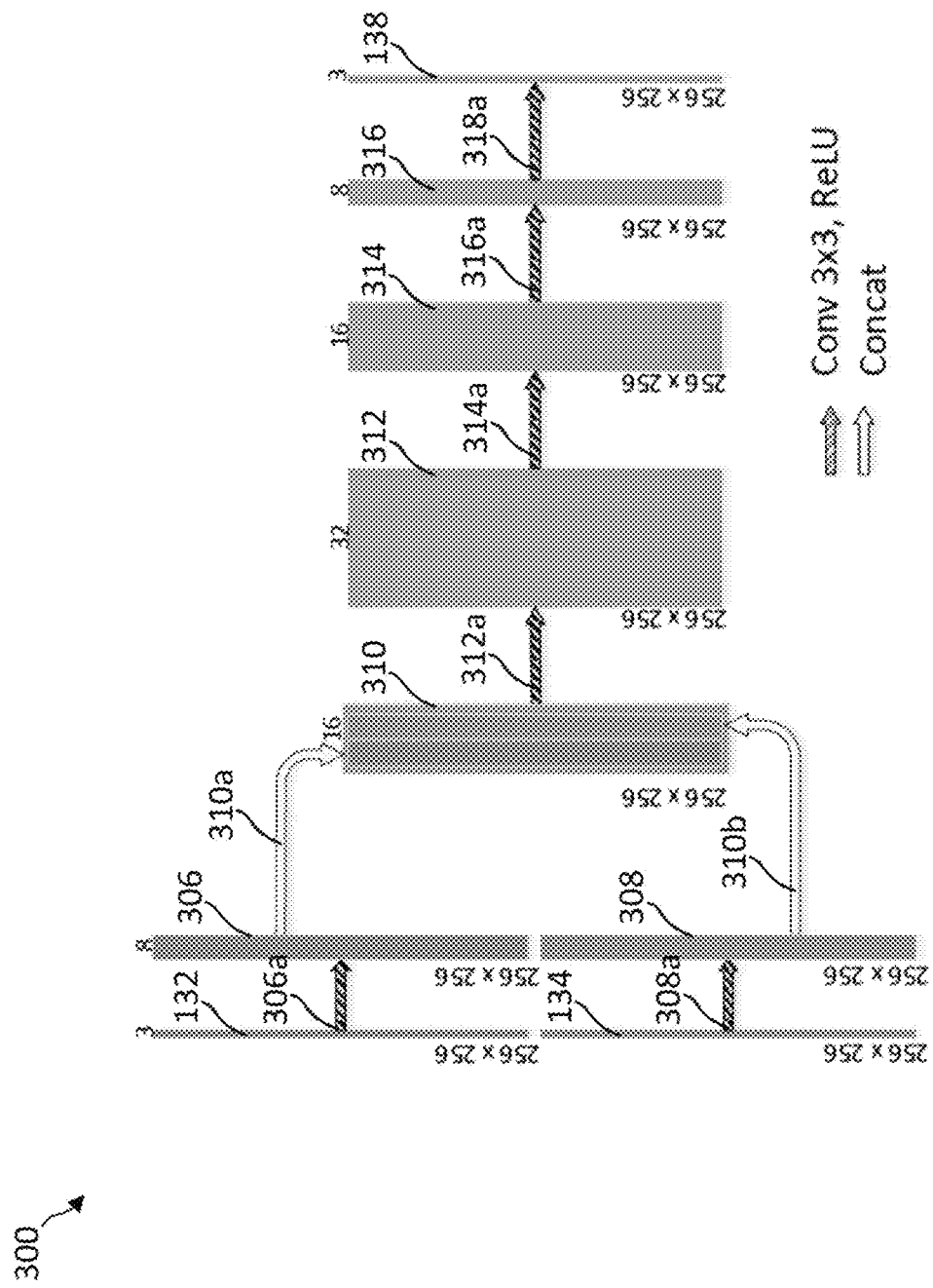
FIG. 3 shows an architecture of a fully convolutional neural network for sensor fusion according to various embodiments.

The neural network 136 may be a fully convolutional neural network. FIG. 3 shows an architecture of a fully convolutional neural network 300 for sensor fusion according to various embodiments. The fully convolutional neural network 300 may include two input streams. In various embodiments, the fully convolutional neural network 300 includes more than two input streams. A first input stream of the fully convolutional neural network 300 may process a first grid 132 and a second input stream of the fully convolutional neural network 300 may process a second grid 134. The first grid 132 and/or the second grid 134 may include more than one feature channel (for example two feature channels, for example three feature channels, for example more than three feature channels). The number of feature channels may be defined by the sensor data provided by the respective sensor of the plurality of sensors. Each feature channel of the plurality of feature channels may be assigned to an occupancy state of a plurality of occupancy states. The plurality of occupancy states may include a first state, a second state, and a third state, wherein the first state includes a free state, the second state includes an unknown state, and the third state includes an occupied state. According to an embodiment the first grid 132 and the second grid 134 include three features channels, wherein the three feature channels include three occupancy states, and wherein the first state includes a free state, the second state includes an unknown state, and the third state includes an occupied state. The dimensions of the first grid 132 and the second grid 134 may be 256×256 grid cells. In various embodiments, the first grid 132 and the second grid 134 may have different dimensions. The fully convolutional neural network 300 may include a plurality of network layers (for example two network layers, for example three network layers, for example more than three network layers). The fully convolutional neural network 300 may include a padding process, so that all layers of the plurality of network layers include the same dimensions. The plurality of network layers may include a plurality of convolutional layers (for example two convolutional layers, for example more than two convolutional layers) and at least one concatenating layer (for example exactly one concatenating layer, for example more than one concatenating layer). Each convolutional layer of the plurality of convolutional layers may be configured to process an input and may be configured to provide an intermediate layer output. Each convolutional layer of the plurality of convolutional layers includes a filter size and an activation function. According to an embodiment each convolutional layer includes a filter size of 3×3 grid cells. The activation function may include a ReLU (rectified linear unit) activation function. Each concatenating layer of the plurality of concatenating layers may be configured to process at least two convolution layer outputs (for example exactly two convolutional layer outputs, for example more than two convolutional layer outputs). Each concatenating layer of the plurality of concatenating layers may be configured to concatenate the at least two convolutional layer outputs and may be configured to provide a concatenating layer output. A concatenation can also be applied to the input occupancy grids (i.e., the first grid 132 and the second grid 134) directly. There is generally no need to have convolutional layers upfront.

The fully convolutional neural network 300 may include a first neural network portion. The first neural network portion may be configured to process the first grid 132. The first neural network portion may include a first convolutional layer 306a of the first input stream. The first convolutional layer 306a may provide a first convolutional layer output 306. The fully convolutional neural network 300 may further include a second neural network portion. The second neural network portion may be configured to process the second grid 134. The second neural network portion may include a second convolutional layer 308a of the second input stream. The second convolutional layer 308a may provide a second convolutional layer output 308. The first convolutional layer 306a and the second convolutional layer 308a may include eight feature channels. In various embodiments, the first convolutional layer 306a and the second convolutional layer 308a include a different number of feature channels. According to an embodiment the first neural network portion includes additional convolutional layers, wherein the additional convolutional layers of the first neural network portion process the first convolutional layer output 306 of the first convolutional layer 306a. The second neural network portion may include additional convolutional layers, wherein the additional convolutional layers of the second neural network portion process the second convolutional layer output 308 of the second convolutional layer 308a.

The fully convolutional neural network 300 may include a fusion neural network portion. The fusion neural network portion may be configured to fuse the processed first grid 132 with the processed second grid 134 into a fused grid 138. According to an embodiment, the fusion neural network portion of the fully convolutional network 300 includes one concatenating layer. The concatenating layer may concatenate the output of the convolutional layers of the input streams. The concatenating layer may include a first concatenating connection 310a. The first concatenating connection 310a may process the first convolutional layer output 306. The concatenating layer may include a second concatenating connection 310b. The second concatenating connection 310b may process the second convolutional layer output 308.

The concatenating layer may concatenate the first convolutional layer output 306 of the first neural network portion and the second convolutional layer output 308 of the second neural network portion. The concatenating layer may be configured to provide a concatenating layer output 310. The concatenating layer output may include sixteen feature channels. In various embodiments, the concatenating layer output 310 includes a different number of feature channels.

The fusion neural network portion may further include a plurality of convolutional layers processing the concatenating layer output 310. According to an embodiment, the fusion neural network portion includes a third convolutional layer 312a, a fourth convolutional layer 314a, a fifth convolutional layer 316a, and a sixth convolutional layer 318a, wherein the sixth convolutional layer 318a outputs a fused grid 138. The fusion neural network portion includes a different number of convolutional layer according to various embodiments. The neural network may be configured to fuse the first grid 132 with the second grid 134 into the fused grid 138, wherein the fused grid 138 may include the same number of feature channels as the first grid 132 and/or the second grid 134.

The neural network 300 may include a plurality of input streams (for example two input streams, for example three input streams, for example more than three input streams), wherein each input stream of the plurality of input streams processes a grid of a plurality of grids. Each input stream of the plurality of input streams may include a plurality of convolutional layers processing the respective grid of the plurality of grids. The concatenating layer may concatenate the output of each input stream of the plurality of input streams. The fusion neural network portion may include a plurality of convolutional layers, wherein the convolutional layers process the concatenating layer output 310. The fusion neural network portion may output a fused grid 138.

In various embodiments, the neural network 136 may include or may be an auto-encoder neural network. The auto-encoder neural network may include an encoding portion and a decoding portion. The encoding portion may include at least one encoding layer (for example exactly one encoding layer, for example two encoding layers, for example more than two encoding layers). The decoding portion may include at least one decoding layer (for example exactly one decoding layer, for example two decoding layers, for example more than two decoding layers). The auto-encoder neural network may include a plurality of encoding layers and a plurality of decoding layers, wherein the number of encoding layers or decoding layers defines the depth of the neural network. According to an embodiment the encoding portion and the decoding portion of an auto-encoder neural network may each include 8 layers, i.e. 8 encoding layers and 8 decoding layers. Each encoding layer of the plurality of encoding layers may include an encoding block and an encoding layer output. Each encoding block of the plurality of encoding blocks may be configured to provide the encoding layer output. Each decoding layer of the plurality of decoding layers may include a decoding block and a decoding layer output. Each decoding block of the plurality of decoding blocks may be configured to provide the decoding layer output.

Figure 4:
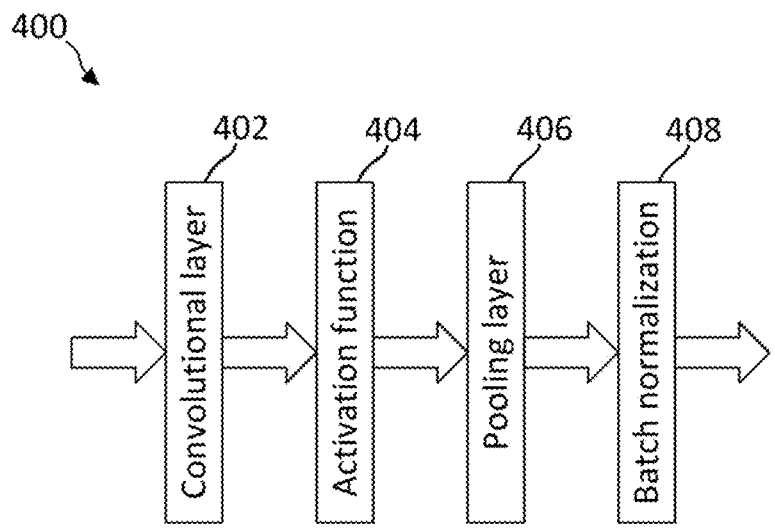
FIG. 4 shows an architecture of an encoding block of an auto-encoder neural network according to various embodiments.

FIG. 4 shows an architecture of an encoding block 400 of an auto-encoder neural network according to various embodiments. The encoding block 400 may include a convolutional layer 402. The convolutional layer 402 may have a filter size of 3×3 grid cells. The encoding block 400 may further include an activation function 404. The activation function 404 may be a ReLU activation function. The encoding block 400 may further include a pooling layer 406. The pooling layer 406 may include a Max-pooling layer. The pooling layer 406 may include 2×2 grid cells (in other words, the pooling layer 406 may include a stride of 2). The pooling layer 406 may include a stride of 2. In various embodiments, the pooling layer 406 includes a different number of grid cells and/or a different number of strides. The encoding block 400 may further include a batch normalization layer 408.

After an encoding block with parameters as described above (stride of 2), the input dimensions are halved. The number of feature channels is an arbitrary choice, defined by the number of filters of the convolutional layer.

Figure 5:
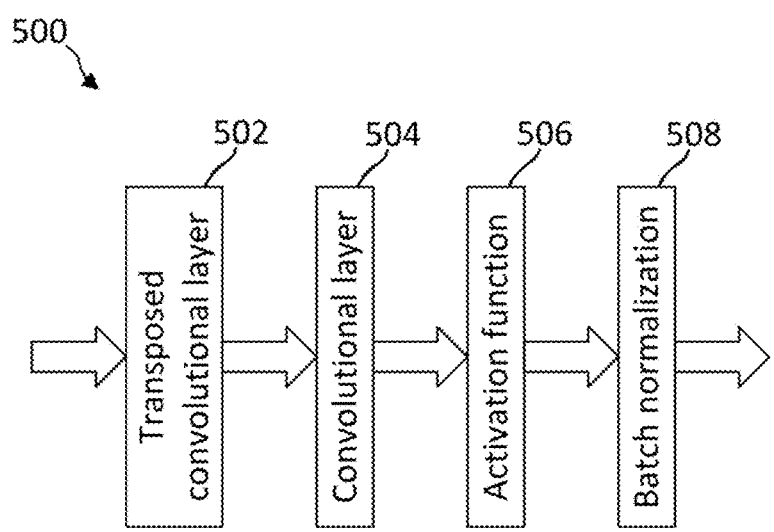
FIG. 5 shows an architecture of a decoding block of an auto-encoder neural network according to various embodiments.

It is to be noted that the order of the layers may vary within the neural network and it is not limited to the specific order as illustrated in the examples of FIG. 4 and FIG. 5.

FIG. 5 shows an architecture of a decoding block 500 of an auto-encoder neural network according to various embodiments. The decoding block 500 may include a transposed convolutional layer 502. The transposed convolutional layer 502 may have a filter size of 3×3 grid cells (and strides of 2 (similar to pooling layers in encoding blocks)). The decoding block 500 may further include a convolutional layer 504. The convolutional layer 504 may have a filter size of 3×3 grid cells. The decoding block 500 may further include an activation function 506. The activation function 506 may be a ReLU activation function. The decoding block 500 may further include a batch normalization layer 508.

The complete decoder (all decoding blocks together) up-samples to the dimensions of the input grids (i.e., the first grid 132 and the second grid 134).

A single decoding block doubles grid dimensions (strides are equal to 2). The number of feature channels is an arbitrary choice. In an embodiment, the number of feature channels is doubled after each decoding block.

Figure 6:
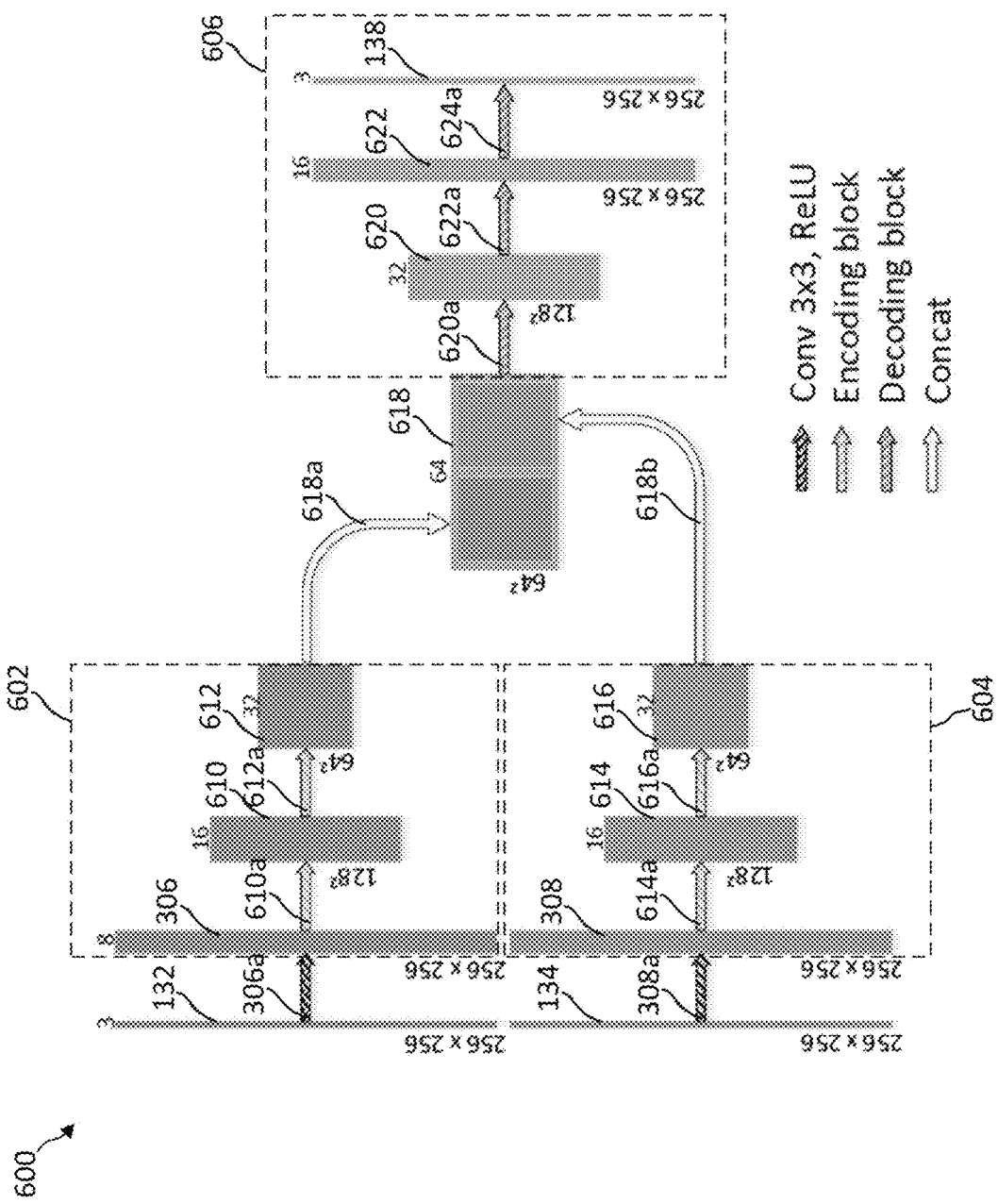
FIG. 6 shows an architecture of an auto-encoder neural network according to various embodiments.

FIG. 6 shows an architecture of an auto-encoder neural network 600 according to various embodiments. The auto-encoder neural network 600 may include a first encoder 602. The first encoder 602 may be configured to process a first grid 132. In various embodiments, as shown in FIG. 6, the first encoder 602 is configured to process a first processed grid, wherein the first processed grid may be a first convolutional layer output 306, and wherein the first convolutional layer 306a may process the first grid 132. The auto-encoder neural network 600 may further include a second encoder 604. The second encoder 604 may be configured to process a second grid 134. In various embodiments, as shown in FIG. 6, the second encoder 604 is configured to process a second processed grid, wherein the second processed grid may be a second convolutional layer output 308, and wherein the second convolutional layer 308a may process the second grid 134.

Each of the first encoder 602 and the second encoder 604 may include at least one encoding layer (for example exactly 1 encoding layer, for example 2 encoding layers, for example more than 2 encoding layers), wherein each encoding layer may include an encoding block 400 and an encoding layer output. The first encoder 602 may include a first encoding block 610a and a second encoding block 612a. The first encoding block 610a may be configured to process the first convolutional layer output 306 and may be further configured to provide a first encoding layer output 610. The first encoding layer output 610 may have dimensions of 128×128 grid cells and may have sixteen feature channels. The second encoding block 612a may be configured to process the first encoding layer output 610 and may be further configured to provide a second encoding layer output 612. The second encoding layer output 612 may have dimensions of 64×64 grid cells and may have thirty-two feature channels. The second encoder 604 may include a third encoding block 614a and a fourth encoding block 616a. The third encoding block 614a may be configured to process the second convolutional layer output 308 and may be further configured to provide a third encoding layer output 614. The third encoding layer output 614 may have dimensions of 128×128 grid cells and may have sixteen feature channels. The fourth encoding block 616a may be configured to process the third encoding layer output 614 and may be further configured to provide a fourth encoding layer output 616. The fourth encoding layer output 616 may have dimensions of 64×64 grid cells and may have thirty-two feature channels.

The auto-encoder neural network 600 may further include at least one concatenating layer (for example exactly one concatenating layer, for example two concatenating layers, for example more than two concatenating layers). Each concatenating layer of the plurality of concatenating layers may be configured to process at least two encoding layer outputs (for example exactly two encoding layer outputs, example more than two encoding layer outputs). Each concatenating layer of the plurality of concatenating layer may process each encoding layer of the plurality of encoding layers via a respective concatenating connection of a plurality of concatenating connections. Each concatenating layer of the plurality of concatenating layers may be configured to concatenate the at least two encoding layer outputs via at least two concatenating connections and may be configured to provide a concatenating layer output. According to an embodiment, the auto-encoder neural network 600 includes one concatenating layer, wherein the one concatenating layer may include a first concatenating connection 618a and a second concatenating connection 618b. The concatenating layer may be configured to provide a concatenating layer output 618. The concatenating layer output 618 may have dimensions of 64×64 grid cells and may have sixty-four feature channels.

The auto-encoder neural network 600 may further include a decoder 606. The decoder 606 may include at least one decoding layer (for example exactly one decoding layer, for example two decoding layers, for example more than two decoding layers), wherein each decoding layer may include a decoding block 500 and a decoding layer output. According to an embodiment, the decoder 606 includes a first decoding block 620a, a second decoding block 622a and a further convolutional layer 624a, wherein the further convolutional layer 624a outputs the fused grid 138. The first decoding block 620a may be configured to process the concatenating layer output 618 and may be further configured to provide a first decoding layer output 62o. The first decoding layer output 620 may have dimensions of 128×128 grid cells and may have thirty-two feature channels. The second decoding block 622a may be configured to process the first decoding layer output 620 and may be further configured to provide a second decoding layer output 622. The second decoding layer output 622 may have dimensions of 256×256 grid cells and may have sixteen feature channels. The further convolutional layer 624a may be configured to process the second decoding layer output 622 and may be further configured to provide a fused grid 138. The fused grid 138 may have dimensions of 256×256 grid cells and may have three feature channels.

According to an embodiment the auto-encoder neural network 600 includes additional encoders, wherein each encoder of the plurality of encoders processes a grid of a plurality of grids and wherein the at least one concatenating layer 618 may concatenate the plurality of processed grids.

Figure 7:
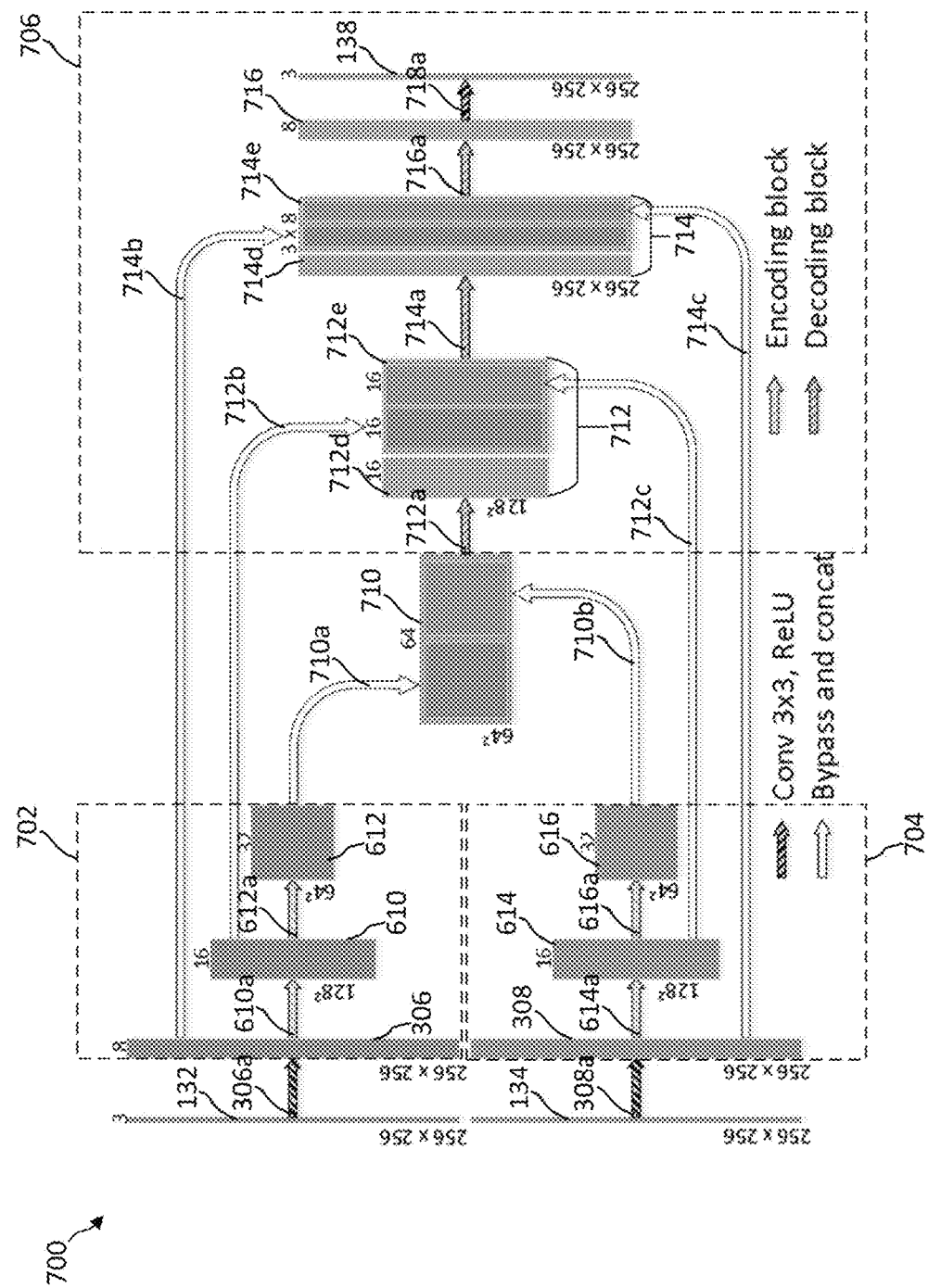
FIG. 7 shows an architecture of an auto-encoder neural network including skip connections according to various embodiments.

FIG. 7 shows an architecture of an auto-encoder neural network 700 according to various embodiments. The auto-encoder neural network 700 may include a first encoder 702. The first encoder 702 may include a plurality of encoding layers according to the first encoder 602. The first encoder 702 may include the first encoding block 610a, the first encoding layer output 610, the second encoding block 612a, and the second encoding layer output 612. The first encoding block 610a may be configured to process the first convolutional layer output 306. The auto-encoder neural network 700 may further include a second encoder 704. The second encoder 704 may include a plurality of encoding layers according to the second encoder 604. The second encoder 704 may include the third encoding block 614a, the third encoding layer output 614, the fourth encoding block 616a, and the fourth encoding layer output 616. The third encoding block 614a may be configured to process the second convolutional layer output 308. The auto-encoder neural network 700 may further include a concatenating layer. The concatenating layer may concatenate the output of the first encoder 702 and the second encoder 704. The concatenating layer may include a first concatenating connection 710a. The first concatenating connection 710a may be configured to process the second encoding layer output 612. The concatenating layer may include a second concatenating connection 710b. The second concatenating connection 710b may be configured to process the fourth encoding layer output 616. The concatenating layer may be configured to provide a concatenating layer output 710. The concatenating layer is one example of a fusion neural network portion.

The auto-encoder neural network 700 may further include a decoder 706. The decoder 706 may be configured to provide the fused grid 138 based on a processed first grid 132 and a processed second grid 134. The decoder 706 may include at least one decoding layer (for example exactly one decoding layer, for example two decoding layers, for example more than two decoding layers). Each decoding layer may include a decoding block 500 and a decoding block output. Each decoding layer may further include a skip concatenating layer, wherein the skip concatenating layer includes at least one skip connection (for example exactly one skip connection, for example two skip connections, for example more than two skip connections). Each skip connection may bypass code from an encoder to a decoder. Each skip connection may skip at least one encoding layer (for example skip exactly one encoding layer, for example skip two encoding layers, for example skip more than two encoding layers). Each skip connection may bypass code from the first encoder 702 and/or the second encoder 704 to the decoder 706. The skip concatenating layer may concatenate a code of at least a part of an encoding layer output of the first encoder 702 and a code of at least a part of an encoding layer output of the second encoder 704. In other words, at least a part of the code of an encoding layer output of the first encoder 702 and at least a part of the code of an encoding layer output of the second encoder 704 are bypassed to a decoding layer of the decoder 706 via skip connections.

The respective skip concatenating layer may concatenate at least a part of the code of the encoding layer output of the first encoder 702 and at least a part of the code of the encoding layer output of the second encoder 704, which have the same dimensions and the same number of feature channels as the decoding block output of the decoding layer assigned to the respective encoding layer output or encoding layer outputs. Each skip concatenating layer may be configured to provide a skip concatenating layer output.

According to an embodiment, the decoder 706 includes a first decoding layer. The first decoding layer may include a first decoding block 712a and a first decoding block output 712d. The first decoding block 712a may be configured to process the concatenating layer output 710 and may be further configured to provide the first decoding block output 712d. The first decoding block output 712d may have dimensions of 128×128 grid cells and may have sixteen feature channels. The first decoding layer may further include a first skip concatenating layer. The first skip concatenating layer may concatenate at least a part of the code of the encoding block of the first encoder 702 and at least a part of the code of the encoding block of the second encoder 704, which have the same dimensions and the same number of feature channels as the first decoding block. The first skip concatenating layer may include a first skip concatenating connection 712b and a second skip concatenating connection 712c. The first skip concatenating connection 712b may be configured to process the first encoding layer output 61o. The second skip concatenating connection 712c may be configured to process the third encoding layer output 614. The first skip concatenating layer may be configured to provide a first skip concatenating layer output 712e. The first decoding layer may include a first decoding layer output 712, wherein the first decoding layer output 712 may include the first decoding block output 712d and the first skip concatenating layer output 712e.

The decoder 706 may further include a second decoding layer. The second decoding layer may include a second decoding block 714a and a second decoding block output 714d. The second decoding block 714a may be configured to process the first decoding layer output 712. In other words, the second decoding block 714a may process the code of the first decoding block output 712d and the code of the first skip concatenating layer output 712e. The second decoding block output 714d may have dimensions of 256× 256 grid cells and may have eight feature channels. The second decoding layer may further include a second skip concatenating layer. The second skip concatenating layer may concatenate at least a part of the code of the encoding block of the first encoder 702 and at least part of the code of the encoding block of the second encoder 704, which have the same dimensions and the same number of feature channels as the second decoding block. The second skip concatenating layer may include a first skip concatenating connection 714b and a second skip concatenating connection 714c. The first skip concatenating connection 714b may be configured to process the first convolutional layer output 306. The second skip concatenating connection 714c may be configured to process the second convolutional layer output 308. The second skip concatenating layer may be configured to provide a second skip concatenating layer output 714e. The second decoding layer may include a second decoding layer output 714, wherein the second decoding layer output 714 may include the second decoding block output 714d and the second skip concatenating layer output 714e.

The decoder 706 may further include a third decoding layer. The third decoding layer may include a yet further convolutional layer 716a. The yet further convolutional layer (which may also be referred to as a decoder convolutional layer) 716a may be configured to process the second decoding layer output 714. In other words, the yet further convolutional layer 716a may process the code of the second decoding block output 714d and the code of the second skip concatenating layer output 714e. The third decoding layer may be configured to provide a yet further convolutional layer output 716. The yet further convolutional layer output 716 may have dimensions of 256×256 grid cells and may have eight feature channels. It should be noted that in various embodiments, a plurality of decoder convolutional layers may be provided in the neural network in order to reduce the number of feature channels to a desired number, e.g. three.

The decoder 706 may further include a further decoder convolutional layer 718a. The further decoder convolutional layer 718a may be configured to process the yet further convolutional layer output 716. The further decoder convolutional layer 718a may be configured to provide a fused grid 138. The fused grid 138 may include the same dimensions and/or the same number of feature channels as the first grid 132 and/or the second grid 134. The fused grid 138 may have dimensions of 256×256 grid cells and may have three feature channels.

Skipping at least a part of the code from the first encoder 702 and/or the second encoder 704 to the decoder 706 via skip connections has the effect that small features are preserved. In other words, skip connections generate a more detailed fused grid 138.

According to an embodiment the auto-encoder neural network 700 includes additional encoders, wherein each encoder of the plurality of encoders processes a grid of a plurality of grids and wherein the at least one concatenating layer may be configured to concatenate the plurality of processed grids. The auto-encoder neural network 700 may further include a plurality of decoding layers, wherein each decoding layer of the plurality of decoding layers may include a decoding block and may further include a skip concatenating layer. The skip concatenating layer may concatenate at least a part of a code of a plurality of encoding blocks. In other words, at least a part of the code of a plurality of encoding block outputs is bypassed to a decoding layer of the decoder 706 via skip connections.

Figure 8:
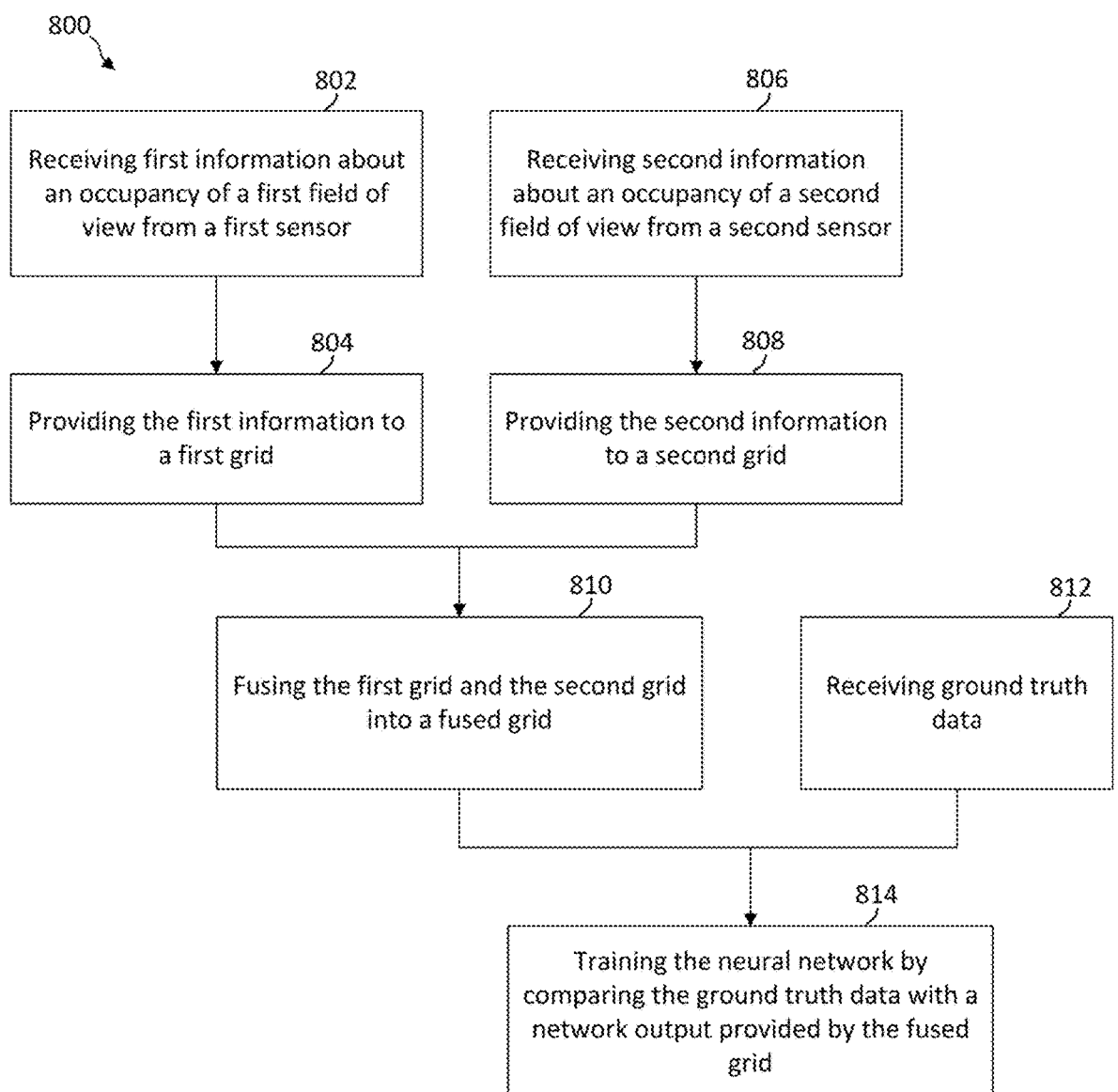
FIG. 8 shows a method of training a neural network according to various embodiments.

FIG. 8 shows a method 800 of training a neural network according to various embodiments. The training method 800 may include receiving first information about an occupancy of a first field of view from a first sensor in 802. The training method 800 may further include providing the first information to a first grid in 804. The first grid may include a plurality of grid cells. The training method 800 may further include receiving second information about an occupancy of a second field of view from a second sensor in 806. The training method 800 may further include providing the second information to a second grid in 808. The second grid may include a plurality of grid cells. The training method 800 may further include fusing the first grid and the second grid into a fused grid in 81o. The training method 800 may further include receiving ground truth data in 812. The training method 800 may include training the neural network by comparing the ground truth data with a network output provided by the fused grid in 814. The ground truth data may include a ground truth grid. Training the neural network may include updating the neural network. The neural network may be trained using an ADAM optimizer.

According to an embodiment the training method 800 includes receiving information about an occupancy of a field of view from additional sensors. The training method 800 may further include providing the information of each sensor of the plurality of sensor to a respective grid of a plurality of grids. The training method 800 may further include fusing the plurality of grids into a fused grid. The training method Boo may further include receiving ground truth data and training the neural network by comparing the ground truth data with a network output provided by the fused grid.

Figure 9:
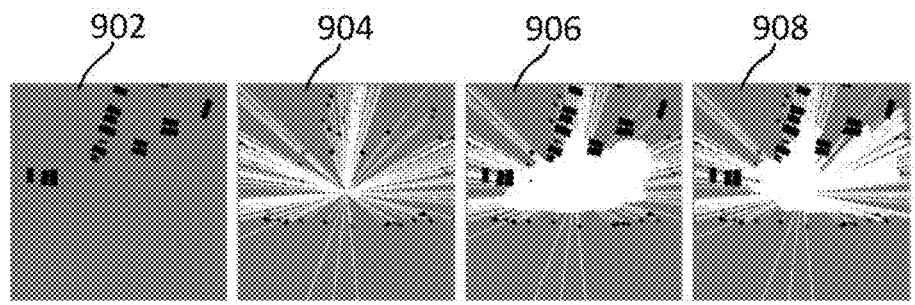
FIG. 9 shows examples of a first grid, a second grid, a fused grid, and a ground truth grid.

FIG. 9 shows examples of a first grid 902, a second grid 904, a fused grid 906, and a ground truth grid 908, wherein a neural network was trained using the first grid 902, the second grid 904 and the ground truth grid 908 and wherein the trained neural network fused the first grid 902 and the second grid 904 to the fused grid 906.

As shown in FIG. 9,
white colored elements in a respective grid indicate an occupancy probability of "0" of the respective grid cell (illustratively: the respective grid cell is considered to be free);
black colored elements in a respective grid indicate an occupancy probability of "1" of the respective grid cell (illustratively: the respective grid cell is considered to be occupied);
grey colored elements in a respective grid indicate an occupancy probability of "0.5" of the respective grid cell (illustratively: the respective grid cell is considered to have an unknown occupancy state).

It is to be noted that in these embodiments, the occupancy probability values are rounded to "0", "0.5" and "1", respectively. However, in various embodiments, the occupancy probability values may have any value in the range from "o" to "1".

In this way, the neural network may be configured to determine a free space within the fused grid. The free space may be a classification result for a grid cell based on the respectively assigned and determined occupancy probability value for the grid cell of the fused grid 138.

Figure 10A:
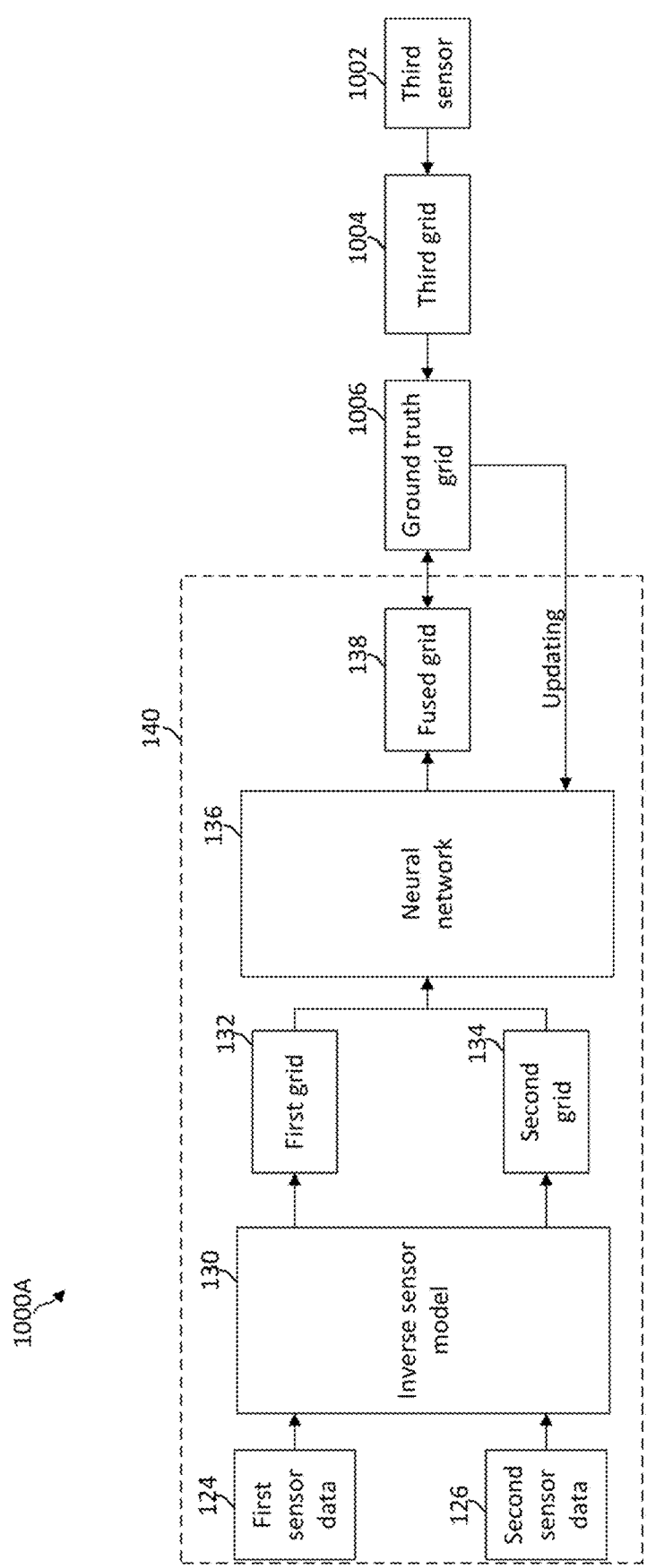
FIG. 10A shows a system for training a neural network according to various embodiments.

FIG. 10A shows a system 1000A for training a neural network according to various embodiments. The training system 1000A may include the processing system 140. The processing system 140 may include an ISM 130 and a neural network 136, wherein the ISM 130 and the neural network 136 may be implemented by a processor 122. The ISM 130 may be configured to process the first sensor data 124 and may be further configured to provide a first grid 132. The ISM 130 may be configured to process the second sensor data 126 and may be further configured to provide a second grid 134. The neural network 136 may be configured to fuse the first grid 132 and the second grid 134 to a fused grid 138. The training system 1000A may further include a third sensor 1002. The third sensor 1002 may be configured to provide third sensor data. The third sensor data may include a third grid 1004. The memory device 120 may be configured to receive the third sensor data and/or the third grid 1004 from the third sensor 1002 and may be further configured to provide the third sensor data and/or the third grid 1004 to the processor 122. The third grid 1004 may include a plurality of grid cells. The third grid 1004 may represent at least a third portion of a third field of view of the third sensor 1002. At least one grid cell of the plurality of grid cells of the third grid 1004 may have information about an occupancy of the third portion of the third field of view assigned to the at least one grid cell. The system 1000A may further include a ground truth grid 1006. The ground truth grid 1006 may include ground truth data. The processor 122 may be configured to process the third grid 1004 and may be configured to provide the ground truth grid 1006. The ground truth grid 1006 may be based on the third grid 1004. In various embodiments, the third grid 1004 is the ground truth grid 1006. The neural network 136 may be trained by comparing the ground truth grid 1006 with the fused grid 138. The neural network 136 may be updated based on the result of the comparison.

According to an embodiment, the training system 1000A includes a plurality of sensors, wherein the processor 122 may process the data provided by the plurality of sensors and wherein the neural network 136 may output a fused grid based on the data provided by the plurality of sensors.

The first sensor 104 may include at least one of a radar sensor or a camera sensor. The second sensor 106 may include at least one of a radar sensor or a camera sensor. The third sensor 1002 may include a LIDAR sensor. The first sensor 104 and/or the second sensor 106 may provide pre-processed sensor data. The pre-processed sensor data may include target lists in case of radar sensors and object lists on case of camera sensors. The neural network may process 2-dimensional data. The camera sensor may be a 2D camera sensor. The camera sensor may be a 3D camera sensor, wherein the 3D data are projected in a 2D plane.

According to an embodiment, the third sensor 1002 includes a LIDAR sensor and the ground truth data include sensor data provided by the third sensor 1002. The ground truth data may be obtained from a measured LIDAR point cloud, wherein a ground plane may be estimated by RANSAC-based plane fitting. The third grid 1004 may be obtained from the ground plane. The ground truth grid 1006 may be based on the third grid 1004 and additional grids of the plurality of grids obtained from the plurality of sensor data provided by plurality of sensors (for example based on all grids of the plurality of grids, for example based on some grids of the plurality of grids).

In various embodiments, the third grid 1004 may be obtained from the measured LIDAR point cloud. It may include all points belonging to the ground plane. They are assumed to be located on a drivable road. All those points may be converted into an occupancy grid with a LIDAR inverse sensor model.

The neural network 136 may be trained based on the ground truth grid 1006. The training may be done using data from a dataset, wherein a plurality of individual frames is stored. The individual frames may include synchronized measurements from a LIDAR sensor, a camera sensor, a radar sensor, and position sensors (IMU and GPS). The camera data may be provided as bounding boxes (2D or 3D), the radar data may be provided as a target list, wherein individual targets consist of at least information about the spatial location of the target (Cartesian coordinates or polar coordinates), and the LIDAR data may be provided as a point cloud (2D or 3D), wherein individual points consist of at least information about spatial location of the reflection point. Radar data may further include information about velocities, uncertainties, and other information about the target. Camera object detections may include parameters such as position, size, orientation, and velocities.

A grid of a plurality of grids obtained from a plurality of sensor data including information about a field of view of a sensor of a plurality of sensors may be obtained for each frame of the plurality of frames. A ground truth grid 1006 may be obtained for each frame of the plurality of frames. The number of frames may be increased by data augmentation. The data augmentation may include random rotations and/or random mirroring. A radar grid is generated by applying an ISM and thus converting the raw data detections to a spatial occupancy probability. A camera grid is obtained by projecting the 3D bounding box of each camera object detection to a 2D ground plane, wherein these footprints are assumed to be occupied and the remaining cells are defined as an unknown occupancy state.

The neural network 136 may be configured to process the plurality of grids and may provide a fused grid 138 based on the plurality of grids. The fused grid 138 may be compared to the ground truth grid 1006. A loss function may include a pixel-wise, i.e. for each grid cell of the plurality of grid cells, softmax classification. The loss function may be applied for each grid of the plurality of grids. The estimated loss of each grid cell of the plurality of grid cells may be summed up to a total grid cell loss. The total grid cell loss of each grid cell of the plurality of grid cells may be summed up for all grid cells of the plurality of grid cells providing a total loss. Now, illustratively, the loss has been calculated. The network may now be changed, so that the loss function is getting smaller for each training iteration. This minimization process may be performed with an ADAM optimizer.

Training the neural network with ground truth data that are based on LIDAR sensor data has the effect that the trained neural network is capable of providing a dense environmental model and hence no LIDAR sensor is further needed once the network is trained. LIDAR sensors usually have a high cost. Thus, it is an aspect of this disclosure to provide a neural network device and a method using a neural network for sensor fusion with reduced cost. Providing a dense environmental model out of sparse sensor data has the further effect that object shapes are provided with higher accuracy and that a drivable free space is estimated.

Figure 10B:
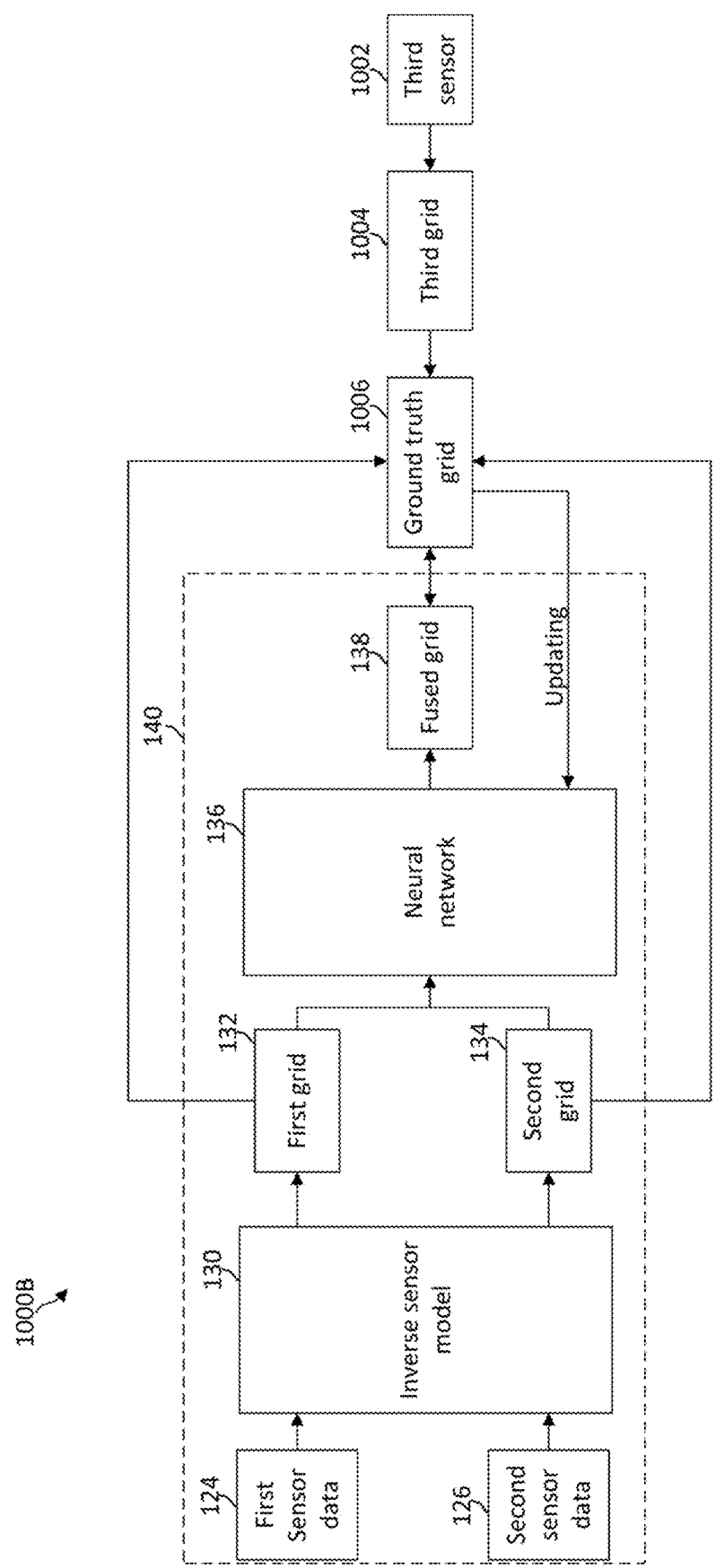
FIG. 10B shows a system for training a neural network according to various embodiments.

FIG. 10B shows a system 1000B for training a neural network according to various embodiments. The training system 1000B may correspond substantially to the training system 1000A. The training system 1000B may differ from the training system 1000A in that the ground truth grid 1006 is generated from ground truth data obtained from the third grid 1004 and ground truth data obtained from the first grid 132 and/or the second grid 134. In other words, the processor is configured to process the third grid 1004 and the first grid 132 and/or the second grid 134 and the processor 122 may be further configured to provide a ground truth grid 1006 based on the third grid 1004 and the first grid 132 and/or the second grid 134.

According to an embodiment the training system 1000B includes additional sensors, wherein the processor 122 may be configured to process the data provided by the plurality of sensors and wherein the neural network 136 may output a fused grid based on the data provided by the plurality of sensors. The processor 122 may be configured to process the plurality of grids (for example from each grid of the plurality of grids, for example from some grids of the plurality of grids) and may be further configured to provide a ground truth grid 1006 based on the plurality of grids (for example based on each grid of the plurality of grids, for example based on some grids of the plurality of grids).

In the following, various aspects of this disclosure will be illustrated:

Example 1 is a neural network device. The neural network device includes a neural network configured to process a first grid comprising a plurality of grid cells. The first grid represents at least a first portion of a field of view of a first sensor. At least one grid cell has information about an occupancy of the first portion of the field of view assigned to the at least one grid cell, the information being based on data provided by the first sensor. The neural network is further configured to process a second grid comprising a plurality of grid cells. The second grid represents at least a second portion of a field of view of a second sensor. At least one grid cell has information about an occupancy of the second portion of the field of view assigned to the at least one grid cell, the information being based on data provided by the second sensor. The neural network is further configured to fuse the processed first grid with the processed second grid into a fused grid. The fused grid includes information about the occupancy of the first portion of the field of view of the first sensor and the occupancy of the second portion of the field of view of the second sensor.

In Example 2, the subject matter of Example 1 can optionally include that at least a portion of the neural network is implemented by one or more processors.

In Example 3, the subject matter of any one of Examples 1 or 2 can optionally include that the neural network is further configured to determine, for at least one grid cell of the fused grid, a probability of the occupancy of the first portion of the field of view of the first sensor and the second portion of the field of view of the second sensor assigned to the at least one grid cell of the fused grid.

In Example 4, the subject matter of any one of Examples 1 to 3 can optionally include that the neural network is further configured to take into account the information about an occupancy of a portion of the field of view next to the first portion and/or next to the second portion when determining information about the occupancy assigned to a respective fused grid cell of the fused grid.

In Example 5, the subject matter of any one of Examples 1 to 4 can optionally include that the structure of the first grid is similar to the structure of the second grid.

In Example 6, the subject matter of any one of Examples 1 to 5 can optionally include that the grid cells of the first grid have a same size and/or shape, and/or that the grid cells of the second grid have a same size and/or shape.

In Example 7, the subject matter of any one of Examples 1 to 6 can optionally include that the first grid forms a first occupancy grid, and/or that the second grid forms a second occupancy grid.

In Example 8, the subject matter of any one of Examples 1 to 7 can optionally include that the neural network includes a first neural network portion configured to process the first grid, a second neural network portion configured to process the second grid, and a fusion neural network portion configured to fuse the processed first grid with the processed second grid into the fused grid.

In Example 9, the subject matter of Example 8 can optionally include that the neural network includes a convolutional neural network.

In Example 10, the subject matter of any one of Examples 1 to 9 can optionally include that the first sensor includes at least one of a first camera sensor or a first radar sensor, and/or that the second sensor includes at least one of a second camera sensor or a second radar sensor.

In Example 11, the subject matter of any one of Examples 1 to 10 can optionally include that the neural network includes or essentially consists of an auto-encoder.

In Example 12, the subject matter of Example 11 can optionally include that the auto-encoder includes a first encoder configured to process the first grid, a second encoder configured to process the second grid, and a decoder configured to provide the fused grid based on the processed first grid and the processed second grid.

In Example 13, the subject matter of any one of Examples 1 to 12 can optionally include that the neural network includes one or more skip connections.

In Example 14, the subject matter of Example 13 can optionally include that the one or more skip connections bypass code from the first neural network portion and/or the second neural network portion to the fusion neural network portion.

In Example 15, the subject matter of any one of Examples 13 or 14 can optionally include that the one or more skip connections bypass code from the first encoder and/or the second encoder to the decoder.

In Example 16, the subject matter of Example 15 can optionally include that bypassing code from the first encoder and/or the second encoder to the decoder includes bypassing code from an encoding layer output or encoding layer outputs of the first encoder and/or the second encoder to a decoding layer or decoding layers of the decoder.

In Example 17, the subject matter of Example 16 can optionally include that bypassing code from an encoding layer output or encoding layer outputs of the first encoder and/or the second encoder to a decoding layer or decoding layers of the decoder includes bypassing code from an encoding layer output or encoding layer outputs having the same neural network depth as the respective decoding layer output.

In Example 18, the subject matter of any one of Examples 16 or 17 can optionally include that bypassing code from an encoding layer output or encoding layer outputs of the first encoder and/or the second encoder to a decoding layer or decoding layers of the decoder includes bypassing code from an encoding layer output or encoding layer outputs having the same dimensions and/or the same number of feature channels as the decoding block output of the respective decoding layer.

In Example 19, the subject matter of any one of Examples 1 to 18 can optionally include that a first inverse sensor model is applied to the data provided by the first sensor to provide the information about the occupancy of the first portion of the field of view of the first sensor, and that a second inverse sensor model is applied to the data provided by the second sensor to provide the information about the occupancy of the second portion of the field of view of the second sensor.

In Example 20, the subject matter of any one of Examples 1 to 19 can optionally include that the neural network is further configured to determine a free space within the fused grid based on the first grid and the second grid.

Example 21 is a system. The system includes a neural network device of any one of Examples 1 to 20. The first sensor may be configured to provide data for the information of the first grid. The second sensor may be configured to provide data for the information of the second grid.

Example 22 is a vehicle. The vehicle includes a driver assistance system including the system of Example 21.

Example 23 is a method. The method includes a neural network processing a first grid including a plurality of grid cells. The first grid represents at least a first portion of a field of view of a first sensor. At least one grid cell has information about an occupancy of the first portion of the field of view assigned to the at least one grid cell, the information being based on data provided by the first sensor. The neural network further processes a second grid including a plurality of grid cells. The second grid represents at least a second portion of a field of view of a second sensor. At least one grid cell has information about an occupancy of the second portion of the field of view assigned to the at least one grid cell, the information being based on data provided by the second sensor. The neural network further fuses the processed first grid with the processed second grid into a fused grid, wherein the fused grid includes information about the occupancy of the first portion of the field of view of the first sensor and the occupancy of the second portion of the field of view of the second sensor.

In Example 24, the subject matter of Example 23 can optionally include that at least a portion of the neural network is implemented by one or more processors.

In Example 25, the subject matter of Example 24 can optionally include that the neural network determines, for at least one grid cell of the fused grid, a probability of the occupancy of the first portion of the field of view of the first sensor and the second portion of the field of view of the second sensor assigned to the at least one grid cell of the fused grid.

In Example 26, the subject matter of any one of Examples 23 to 25 can optionally include that the neural network takes into account the information about an occupancy of a portion of the field of view next to the first portion and/or next to the second portion when determining information about the occupancy assigned to a respective fused grid cell of the fused grid.

In Example 27, the subject matter of any one of Examples 23 to 26 can optionally include that the structure of the first grid is similar to the structure of the second grid.

In Example 28, the subject matter of any one of Examples 23 to 27 can optionally include that the grid cells of the first grid have the same size and/or shape, and/or that the grid cells of the second grid have the same size and/or shape.

In Example 29, the subject matter of any one of Examples 23 to 28 can optionally include that the first grid forms a first occupancy grid, and/or that the second grid forms a second occupancy grid.

In Example 30, the subject matter of any one of Examples 23 to 29 can optionally include that the neural network includes a first neural network portion processing the first grid, a second neural network portion processing the second grid, and a fusion neural network portion fusing the processed first grid with the processed second grid into the fused grid.

In Example 31, the subject matter of Example 30 can optionally include that the neural network includes a convolutional neural network.

In Example 32, the subject matter of any one of Examples 23 to 31 can optionally include that the first sensor includes at least one of a first camera sensor or a first radar sensor, and/or that the second sensor includes at least one of a second camera sensor or a second radar sensor.

In Example 33, the subject matter of any one of Examples 23 to 32 can optionally include that the neural network includes an auto-encoder.

In Example 34, the subject matter of Example 33 can optionally include that the auto-encoder includes a first encoder processing the first grid, a second encoder processing the second grid, and a decoder processing the fused grid based on the processed first grid and the processed second grid.

In Example 35, the subject matter of any one of Examples 30 to 34 can optionally include that the neural network includes one or more skip connections.

In Example 36, the subject matter of Example 35 can optionally include that the one or more skip connections bypass code from the first neural network portion and/or the second neural network portion to the fusion neural network portion.

In Example 37, the subject matter of any one of Examples 35 or 36 can optionally include that the one or more skip connections bypass code from the first encoder and/or the second encoder to the decoder.

In Example 38, the subject matter of Example 37 can optionally include that bypassing code from the first encoder and/or the second encoder to the decoder includes bypassing code from an encoding layer output or encoding layer outputs of the first encoder and/or the second encoder to a decoding layer or decoding layers of the decoder.

In Example 39, the subject matter of Example 38 can optionally include that bypassing code from an encoding layer output or encoding layer outputs of the first encoder and/or the second encoder to a decoding layer or decoding layer output of the decoder includes bypassing code from an encoding layer output or encoding layer outputs having the same neural network depth as the respective decoding layers.

In Example 40, the subject matter of any one of Examples 38 or 39 can optionally include that bypassing code from an encoding layer output or encoding layer outputs of the first encoder and/or the second encoder to a decoding layer or decoding layers of the decoder includes bypassing code from an encoding layer output or encoding layer outputs having the same dimensions and/or the same number of feature channels as the decoding block output of the respective decoding layer.

In Example 41, the subject matter of any one of Examples 23 to 40 can optionally include that a first inverse sensor model is applied to the data provided by the first sensor to provide the information about the occupancy of the first portion of the field of view of the first sensor, and that a second inverse sensor model is applied to the data provided by the second sensor to provide the information about the occupancy of the second portion of the field of view of the second sensor.

In Example 42, the subject matter of any one of Examples 23 to 41 can optionally include that the neural network further determines a free space within the fused grid based on the first grid and the second grid.

Example 43 is a method of training a neural network. The method may include: receiving first information about an occupancy of a first field of view from a first sensor, providing the first information to a first grid including a plurality of grid cells, receiving second information about an occupancy of a second field of view from a second sensor, providing the second information to a second grid including a plurality of grid cells, receiving ground truth data, fusing the first grid and the second grid into a fused grid, and training the neural network by comparing the ground truth data with a network output provided by the fused grid.

In Example 44, the subject matter of Example 43 can optionally include that the ground truth data are received from a third sensor.

In Example 45, the subject matter of any one of Examples 43 or 44 can optionally include that the ground truth data are obtained from a third grid received from a third sensor and from the first grid received from the first sensor and/or the second grid received from the second sensor.

In Example 46, the subject matter of any one of Examples 44 or 45 can optionally include that the first sensor includes at least one of a radar sensor or a camera sensor, that the second sensor includes at least one of a radar sensor or a camera sensor, and that the third sensor includes a LIDAR sensor.

What is claimed is:

1. A neural network device comprising:
a neural network comprising
a first convolutional layer configured to process a first grid comprising a first plurality of grid cells, wherein the first grid represents at least a first portion of a field of view of a first sensor, wherein at least one grid cell of the first plurality of grid cells has information about an occupancy of the first portion of the field of view assigned to the at least one grid cell, and the information about the occupancy of the first portion of the field of view is based on data provided by the first sensor;
a second convolutional layer configured to process a second grid comprising a second plurality of grid cells, wherein the second grid represents at least a second portion of a field of view of a second sensor, at least one grid cell of the second plurality of grid cells has information about an occupancy of the second portion of the field of view assigned to the at least one grid cell, and the information about the occupancy of the second portion of the field of view is based on data provided by the second sensor, wherein the first portion of the field of view overlaps with the second portion of the field of view;
a concatenating layer configured to concatenate an output of the first convolutional layer with an output of the second convolutional layer; and
a third convolutional layer configured to process an output of the concatenating layer and provide a fused grid, wherein the fused grid includes information about the occupancy of the first portion of the field of view of the first sensor and the occupancy of the second portion of the field of view of the second sensor.

2. The neural network device of claim 1, wherein at least a portion of the neural network is implemented by one or more processors.

3. The neural network device of claim 1, wherein the neural network is further configured to determine, for at least one grid cell of the fused grid, a probability of the occupancy of the first portion of the field of view of the first sensor and the second portion of the field of view of the second sensor assigned to the at least one grid cell of the fused grid.

4. The neural network device of claim 1, wherein the neural network is further configured to take into account the information about an occupancy of a portion of the field of view next to the first portion or next to the second portion when determining information about the occupancy assigned to a respective fused grid cell of the fused grid.

5. The neural network device of claim 1, wherein the neural network comprises:
a first neural network portion configured to process the first grid;
a second neural network portion configured to process the second grid; and
a fusion neural network portion configured to fuse the processed first grid with the processed second grid into the fused grid.

6. The neural network device of claim 5, wherein:
the neural network comprises an auto-encoder; and
wherein the auto-encoder comprises:
a first encoder configured to process the first grid,
a second encoder configured to process the second grid, and
a decoder configured to provide the fused grid based on the processed first grid and the processed second grid.

7. The neural network device of claim 5, wherein:
the neural network comprises one or more skip connections; and
the one or more skip connections bypass code from the first neural network portion or the second neural network portion to the fusion neural network portion.

8. The neural network device of claim 1, wherein:
a first inverse sensor model is applied to the data provided by the first sensor to provide the information about the occupancy of the first portion of the field of view of the first sensor; and
a second inverse sensor model is applied to the data provided by the second sensor to provide the information about the occupancy of the second portion of the field of view of the second sensor.

9. The neural network device of claim 1, wherein the neural network is further configured to determine a free space within the fused grid based on the fused grid.

10. A system, comprising:
the device of claim 1;
the first sensor configured to provide data for the information of the first grid; and
the second sensor configured to provide data for the information of the second grid.

11. A vehicle, comprising:
a driver assistance system comprising the system of claim 10.

12. A method, comprising:
processing, by a first convolutional layer of a neural network, a first grid comprising a first plurality of grid cells, wherein the first grid represents at least a first portion of a field of view of a first sensor, wherein at least one grid cell has information about an occupancy of the first portion of the field of view assigned to the at least one grid cell, the information being based on data provided by the first sensor;
processing, by a second convolutional layer of the neural network, a second grid comprising a second plurality of grid cells, wherein the second grid represents at least a second portion of a field of view of a second sensor, wherein at least one grid cell has information about an occupancy of the second portion of the field of view assigned to the at least one grid cell, the information being based on data provided by the second sensor;
concatenating, by a concatenating layer of the neural network, an output of the first convolutional layer with an output of the second convolutional layer; and
processing, by a third convolutional layer of the neural network, the output of the concatenating layer to form a fused grid, wherein the fused grid comprises information about the occupancy of the first portion of the field of view of the first sensor and the occupancy of the second portion of the field of view of the second sensor.

13. The method of claim 12, wherein at least a portion of the neural network is implemented by one or more processors.

14. The method of claim 12, further comprising:
determining, by the neural network, for at least one grid cell of the fused grid, a probability of the occupancy of the first portion of the field of view of the first sensor and the second portion of the field of view of the second sensor assigned to the at least one grid cell of the fused grid.

15. The method of claim 12, further comprising:
applying a first inverse sensor model to the data provided by the first sensor to provide the information about the occupancy of the first portion of the field of view of the first sensor; and
applying a second inverse sensor model to the data provided by the second sensor to provide the information about the occupancy of the second portion of the field of view of the second sensor.

16. The method of claim 12, further comprising:
receiving the information about the occupancy of the field of view from the first sensor;
receiving the information about the occupancy of the field of view from the second sensor;
receiving ground truth data; and
training the neural network by comparing the ground truth data with a network output provided by the fused grid.

17. The method of claim 16, wherein receiving the ground truth data comprises receiving the ground truth data from a third sensor.

18. The method of claim 17, wherein:
the first sensor comprises a radar sensor or a camera sensor; and
the second sensor comprises a radar sensor or a camera sensor; and
the third sensor comprises a LIDAR sensor.

19. The method of claim 16, wherein receiving the ground truth data comprises:
obtaining the ground truth data from a third grid received from a third sensor and from the first grid received from the first sensor and/or the second grid received from the second sensor.

20. A system comprising:
a first sensor;
a second sensor;
an inverse sensor model comprising a first neural network configured to receive data from the first sensor and the second sensor, and provide:
a first grid comprising a first plurality of grid cells, wherein the first grid represents at least a first portion of a field of view of the first sensor, wherein at least one grid cell of the first plurality of grid cells has information about an occupancy of the first portion of the field of view assigned to the at least one grid cell, and
a second grid comprising a second plurality of grid cells, wherein the second grid represents at least a second portion of a field of view of the second sensor, at least one grid cell of the second plurality of grid cells has information about an occupancy of the second portion of the field of view assigned to the at least one grid cell, and the information about the occupancy of the second portion of the field of view is based on data provided by the second sensor, wherein first portion of the field of view overlaps with the second portion of the field of view;
a second neural network comprising:
a first convolutional layer configured to process the first grid;
a second convolutional layer configured to process the second grid;
a concatenating layer configured to concatenate an output of the first convolutional layer with an output of the second convolutional layer; and
a third convolutional layer configured to process an output of the concatenating layer and provide a fused grid, wherein the fused grid includes information about the occupancy of the first portion of the field of view of the first sensor and the occupancy of the second portion of the field of view of the second sensor.

* * * * *